March 30, 1965  W. J. McCLIVE  3,175,845
TRAILER AND WHEEL-COUPLED VEHICLE HITCH THEREFOR
Filed Aug. 15, 1963  2 Sheets-Sheet 1
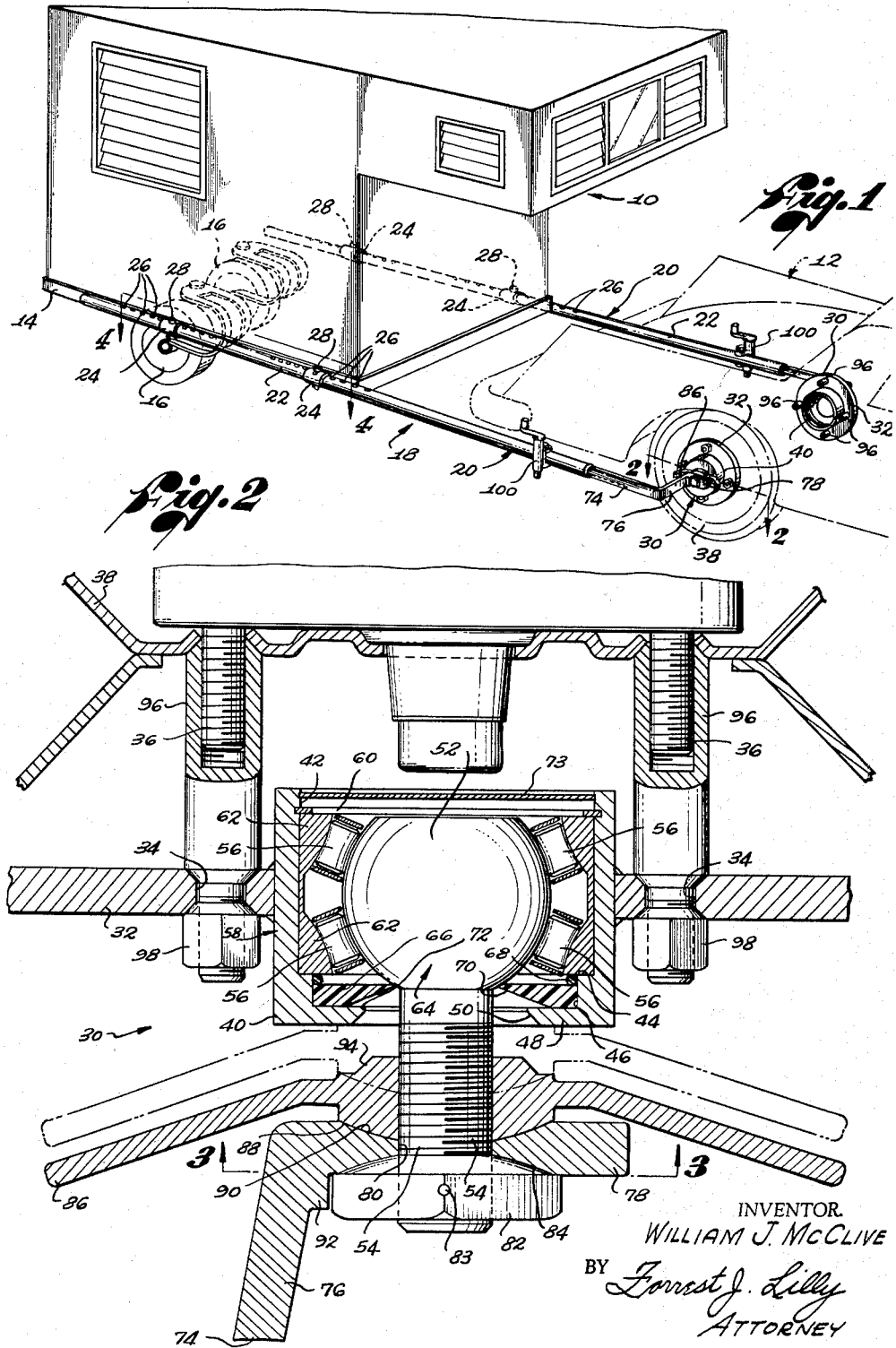
INVENTOR.
WILLIAM J. McCLIVE
BY Forrest J. Lilly
ATTORNEY March 30, 1965   W. J. McCLIVE   3,175,845
TRAILER AND WHEEL-COUPLED VEHICLE HITCH THEREFOR
Filed Aug. 15, 1963   2 Sheets-Sheet 2

INVENTOR.
WILLIAM J. McCLIVE
BY Forrest J. Lilly
ATTORNEY

3,175,845
TRAILER AND WHEEL-COUPLED VEHICLE HITCH THEREFOR

William J. McClive, 24019 Hartland St., Canoga Park, Calif.
Filed Aug. 15, 1963, Ser. No. 302,252
3 Claims. (Cl. 280—460)

This invention relates generally to improvements in trailers of the type which are designed to be towed by passenger vehicles. The invention relates more particularly to an improved trailer and trailer hitch combination and to a unique wheel coupling for use therein.

My copending application Serial No. 50,982 filed August 22, 1960, and entitled Single-Wheeled Concrete Mixer and Vehicle Hitch Therefor discloses a unique trailer concept wherein the hitch of the towed vehicle, or trailer, is coupled to the rear wheels, rather than to the chassis or rear axle, of the towing vehicle. One of the primary advantages of such a wheel-coupled hitch resides in the fact that the forces and loads exerted on the towing vehicle by the towed vehicle are transmitted directly through the rear wheels to the ground and thus do not react on the chassis of the towing vehicle.

My copending application Serial No. 169,732 filed January 30, 1962, and entitled Vehicle Hitches and Wheel Coupling Means Therefor discloses certain improvements in wheel-coupled vehicle hitches. Generally speaking, these improvements reside in improved wheel couplings which provide universal connections between the hitch arms and the vehicle and in improved overall hitch configurations. Such universal wheel couplings are designed to accommodate the manufacturing tolerances involved in the fabrication of vehicle wheels and to accommodate vehicles with independent rear wheel suspension systems. The improved hitch configurations are designed for use, particularly, with so-called travel trailers and embody certain unique spring features.

A general object of the present invention is to provide further improvements in wheel-coupled trailers of the general character discussed above and further improvements in wheel couplings therefor.

A more specific object of the invention is to provide improved wheel couplings of the character described which embody certain highly unique and desirable bearing, sealing, and locking features.

Another object of the invention is to provide an improved wheel-coupled trailer and hitch combination which embodies certain unique springing and load-equalizing features.

Other objects, advantages, and features of the invention will become evident to those skilled in the art as the description proceeds.

Briefly, the objects of the invention are attained in the illustrative embodiment thereof by providing a trailer and hitch combination equipped with a frame mounting two rear, centrally positioned, ground-engaging wheels and two forwardly extending hitch arms which straddle the rear wheels of the towing vehicle. Rotatably mounted on the forward ends of these arms are the improved wheel couplings of the invention. Among the improved features of these wheel couplings are the self-aligning roller bearings and combined dirt and grease seals embodied therein. Another improved feature of these wheel couplings resides in the locking means embodied therein which serve the dual function of locking the hitch arms to the couplings in such manner as to facilitate coupling and uncoupling of the arms and locking the wheel couplings in an inoperative condition when the towing vehicle is driven without the trailer.

The primary features of improvement of the trailer and hitch combination reside in an improved torsion spring action embodied in the hitch arms which improves the riding characteristics of the trailer and ensures equal load distribution on the dual trailer wheels, and in the manner of attachment of the hitch arms to the trailer frame.

The invention has certain other unique features of construction and operation which will present themselves as the description proceeds.

The invention will now be described in detail by reference to the attached drawings wherein:

FIG. 1 is a perspective view of the present trailer and trailer hitch combination, illustrating the towing vehicle in phantom lines;

FIG. 2 is an enlarged section taken on line 2—2 in FIG. 1;

Figure 3:
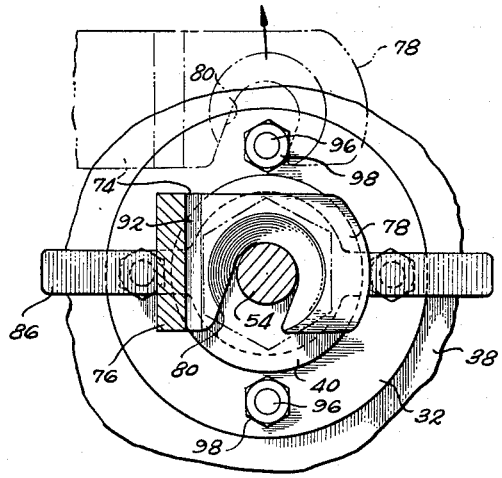
FIG. 3 is a reduced section taken on line 3—3 in FIG. 2.

In these drawings, 10 is a trailer constructed in accordance with the invention and 12 is a vehicle for towing the trailer. Trailer 10, which is shown to be a so-called travel trailer, has a chassis 14 supported at its rear end by two swivel-type, ground-engaging wheels 16. These wheels are preferably located a distance inwardly of the trailer sides, as shown, so that the wheels are positioned relatively close to one another and to the longitudinal centerline of the trailer chassis 14. This location of the wheels tends to minimize relative lateral tilting or rocking of the trailer relative to the towing vehicle when traveling over an uneven terrain, thereby enabling the trailer to follow more closely the lateral tilting motion of the towing vehicle on such terrain and minimizing the strain on the hitch, to be described shortly. The wheels 16 are also preferably staggered in the longitudinal direction of the trailer chassis, as shown, so that both wheels do not hit a bump in the road simultaneously.

The improved vehicle hitch of the invention is denoted in its entirety in the drawings by the numeral 18. This hitch comprises two hitch arms 20 each including a rear tubular section 22. These tubular arm sections are slidably fitted in sleeve brackets 24 welded or otherwise rigidly fixed to the sides of the trailer chassis 14. Each tubular arm section has a series of holes 26 extending therethrough and spaced therealong. Extending through holes in the bracket sleeves 24 and holes 26 in the hitch arms are pins or bolts 28. These pins, then, serve to lock the arms to the bracket sleeves. The multiplicity of pin-receiving holes 26 in the hitch arms enables the latter to be longitudinally adjusted relative to the trailer by withdrawing the pins, sliding the arms in one direction or the other to a new set of holes 26, and then reinserting the pins through the bracket sleeves and arms. The locking pins may be provided with any convenient means to prevent their accidental disengagement from the bracket sleeves. For reasons to be explained shortly, it may be desirable to make the locking-pin-receiving holes 29 in the forward bracket sleeves 24 circumferentially elongated, or to circumferentially elongate the forward arm holes 26, or omit the forward locking pins altogether.

Carried on the forward ends of the hitch arms 20 are improved wheel couplings 30 according to the invention. Wheel couplings 30 are identical and each comprises a wheel mounting disc or plate 32 having holes 34 which are so located that they may be aligned with lug bolts 36 on the rear wheels 38 of the towing vehicle 12. In this connection, it is to be noted that the forward ends of the hitch arms 20 are spaced to straddle the rear wheels, whereby the wheel couplings may be secured to the wheels in the manner described below. The mounting plates 32 of the illustrated wheel couplings have a lesser number of holes 34 than the number of lug bolts 36, for reasons to be seen shortly. The mounting plates may, however, have the same number of holes as lug bolts or the plates may have different series of holes matching the different lug bolt spacings or different cars.

Coaxially fixed in the wheel mounting plate 32 of each wheel coupling 30 is a cylindrical bearing housing 40 which projects beyond each side of the plate. Extending axially into one end of the housing is a bore 42, the remote end of which is reduced somewhat in diameter to form a shoulder 44 and a land 46. At the opposite end of the bearing housing is an inwardly directed flange 48 having a reduced coaxial opening 50 therethrough. Positioned within the bearing housing is ball 52 with a shaft 54 which extends through the flange opening 50. About the ball are two rows of concave bearing rollers 56. These rollers seat against and are contoured to match the curvature of the ball. About the rollers 56 is an outer annular bearing race 58 which is positioned between the housing shoulder 44 and a snap ring 60 fitted in an internal groove in the housing. Bearing race 58 has two convex raceways 62 which are engaged by and are rounded to match the curvature of the bearing rollers 56. The bearing structure just described will be observed to comprise a so-called self-aligning bearing. This bearing, which is designated in its entirety by the numeral 64, obviously provides a rotary, universal swivel connection between the wheel mounting plate 32 and the shaft 54, whereby the plate can both swivel and rotate relative to the shaft.

This self-aligning bearing forms one important feature of the present improved wheel couplings 30. Another important feature of the wheel couplings resides in the improved dirt and grease seal embodied therein. This seal comprises a resilient seal ring 66 positioned in the bearing housing 40 and seating against the housing flange 48. Seal ring 66 is retained in position by a seal-retaining ring 68 of rubber or other material which is positioned between the seal ring and the outer bearing race 58. The outer surface of the seal ring 66 is tapered toward the central hole through the ring to provide the latter with a relatively thin, inner annular lip 70 which bears against the surface of the bearing ball 52, about the ball shaft 54. The hole in the seal ring will be observed to be somewhat larger in diameter than the ball shaft to accommodate swivel movement of the wheel mounting plate 32. During both rotary and swivel movement of the mounting plate, the bearing ring lip 70 slides along the surface of the bearing ball 52, thereby providing a dirt and grease seal between the ball and bearing housing 40. The housing flange 48 and the tapered surface of the seal ring 66 define therebetween an annular V groove 72 which will catch any grease which leaks past the seal ring and is thrown out by centrifugal force during rotation of the wheel mounting plate 32. The end of the bearing housing facing the wheel is sealed by a removable cover 73.

Hitch arms 20 have forward end sections 74 which comprise vertically disposed, rectangular spring metal bars which are welded or otherwise rigidly joined at their rear ends to the forward ends of the tubular hitch arm sections 22. The forward ends of these tubular sections are spaced a distance somewhat greater than the spacing between the forward ends of the hitch arms proper, that is, the forward ends of the metal bar sections 74. Accordingly, these sections are bent inwardly for a distance and then forwardly, whereby the spring bars have inclined, generally transverse center portions 76 and parallel, longitudinally disposed, forward extremities 78.

The forward hitch arm extremities 78 have slots 80 which receive the ball shafts 54. Slots 80 open downwardly and are slightly rearwardly inclined toward their lower open ends. Threaded on the outer end of each ball shaft is a polygonal head or nut 82, the inner surface of which is spherically contoured in the manner shown. Head 82 is releasably retained on the shaft by a removable pin 83 to permit removal of the shaft and its ball 52 from bearing 64. The opposing surfaces of the forward hitch arm extremities 78 are correspondingly spherically recessed at 84 to seat the respective spherical heads 82. Threaded on each ball shaft 54 is a relatively large wing nut 86 having a spherically contoured surface 88 confronting the adjacent forward hitch arm extremity 78. The opposing surface of the arm extremity is spherically recessed at 90 to seat the wing nut.

It is clear that the wing nuts 86 may be tightened against the hitch arms 20, thereby securing the arms to the wheel couplings 30. When the wing nuts are backed off, the arms may be disengaged from the wheel couplings by simply lifting them off the ball shafts 54. The spherical seating surfaces described above aid in preventing the clamping pressure of the wing nuts from spreading the notched or slotted forward ends of the hitch arms. It is desirable to prevent the bearing balls 52 from turning during rotation of the wheel mounting plates 32, as described below. To this end, the forward extremities of the hitch arms 20 are provided with lugs 92 which engage flats on the ball shaft heads 82.

As will be seen shortly, it is desirable at times to be able to lock the ball shafts 54 to their respective bearing housings 40. To this end, each wing nut 86 has a tapered seating surface 94 presented toward its respective bearing housing and adapted to seat in the flange opening 50 in the housing when the wing nut is tightened against the housing. In this way, the ball shafts may be rigidly locked in coaxial positions relative to their respective wheel mounting plates 32.

The wheel couplings 30 are attached to the rear wheels 38 of the towing vehicle 12, as follows: The wheel couplings are preferably removed from the hitch arms 20 and the lug nuts are removed from the lug bolts 36 of the towing vehicle which correspond to the holes 34 in the wheel mounting plates 32. Lug bolt extensions 96 are then threaded on these lug bolts and the wheel mounting plates 32 are placed over the threaded extremities of the extensions in the manner shown in the drawings. Nuts 98 are then threaded on the lug bolt extensions 96 to secure the plates in position. The lug bolt extensions 96 and their nuts 98 are conically tapered and the holes 34 in the wheel mounting plates 32 are countersunk, as shown, for centering purposes. The holes 34 in the wheel mounting plates are located so that when the wheel couplings 30 are installed on the towing vehicle wheels, as described above, the swivel centers of the self-aligning bearings 64 are located on the rotation axis of the wheels.

After the wheel couplings 30 have thus been installed, the ball shafts 54 are locked in coaxial position by tightening the wing nuts 86 against their respective bearing housings 40, as described above. The hitch arms 20 can then be positioned over the shafts and secured to the latter by running the wing nuts out against the arms, also as described above.

It is evident from the preceding description that when the trailer 10 is towed behind the towing vehicle 12, the loads and forces exerted on the latter vehicle by the trailer are transmitted directly through the rear wheels 38 of the towing vehicle to the ground. These loads and forces, therefore, do not react on the vehicle chassis to cause undesirable movements and jarring of the chassis. The universal swivel action of the self-aligning bearings 64 in the wheel couplings 30 compensate for the manufacturing tolerances involved in the manufacture of automobile wheel discs which result in slight variations in the depth of the lug nut recesses in the disc and, thereby, in a displacement of the wheel mounting plates 32 of wheel couplings 30 from planes precisely normal to the rotation axis of the towing vehicle wheels 38. If the wheel coupling shafts 54 were rigid on the wheel mounting plates 32, for example, this displacement of the plates would result in misalignment of the shafts relative to the rotation axis of the wheels and, therefore, wobble or eccentric motion of the shafts and vibration and twisting of the hitch arms.

An additional advantage of the swivel action of the present self-aligning bearings 64 is that the force of the hitch arms on the wheel mounting plates 32 creates pure shear forces on the wheel lug bolts and bolt extensions which act in the planes of the mounting plates, rather than prying forces as would exist if the shafts 54 were rigid on the mounting plates. Also, the present hitch is adapted for connection to vehicles having independent rear wheel suspension.

The self-aligning bearings 64 employed in the present wheel couplings 30 are superior to the swivel coupling and bearing arrangements of my copending application Serial No. 169,732 in that they are more compact and allow more clearance for the projecting axles of some makes of automobiles. Also, because the present self-aligning bearings are smaller, the present wheel couplings can be made to fit smaller wheels. It is evident that the present hitch 18 and, particularly, its improved wheel couplings 30 are uniquely designed to facilitate uncoupling of the trailer 10 from and coupling of the trailer to the towing vehicle, whereby the latter may be easily left behind, when desired. In this regard, for example, when uncoupling the trailer, the wing nuts 86 are loosened and run inwardly against the bearing housings 40, as described. The hitch arms 20 are then simply jacked up to disengage the arms from the ball nut shafts 54, after which the towing vehicle is driven out from underneath the hitch arms. The trailer is easily recoupled to the towing vehicle by reversing the above procedure. While the trailer is thus being uncoupled or recoupled, the ball shafts 54 are firmly fixed in positions coaxial with the wheels 38 of the towing vehicle, whereby removal of the hitch arms from these shafts and reassembly of the arms on the shafts is greatly simplified. The spherical mating surfaces 84, 88 and 90 on the hitch arms, wing nuts, and heads 82 of the ball nut shafts prevent accidental disengagement of the arms when towing the trailer.

When the trailer is to be uncoupled from the towing vehicle 12 for only short periods, it may be desirable to drive the vehicle without removing the wheel couplings 30. In this case, the ability to lock the ball shafts 54 in coaxial position by means of their wing nuts 86 is a distinct advantage since it prevents the shafts from gyrating as the wheels turn. When the wing nuts are tightened against the bearing housings 40, they also provide secondary seals, by virtue of the contact of the wing nut seating surfaces 94 with the bearing housings, which prevent the entrance of water and dirt into the bearings.

The inturned ends of the hitch arms 20, comprising spring bars as they do, act to cushion the fore and aft thrusts which occur during acceleration and braking of the towing vehicle 12. The vehicle hitch 18 embodies a further spring action. This latter spring action is a torsional spring action which occurs in the tubular hitch arm sections 22 and is attained by making these arm sections in such a way that they possess a degree of torsional elasticity. It is evident that with such torsionally elastic hitch arms, any vertical springing movement of the rear wheels 38 of the towing vehicle 12, produced by bumps in the road, for example, tends to torsionally twist, rather than bodily raise and lower, the hitch arms. Thus, the hitch arms elastically cushion the impact of such wheel movements on the trailer 10. Similarly, vertical thrusts or abrupt vertical forces on the forward ends of the hitch arms 20, as occur when towing the trailer due to springing of the latter, acceleration and deceleration forces on the trailer, and so on, are cushioned by the torsional elasticity of the hitch arms.

The torsional elasticity of the hitch arms 20 has one further, very important and unique advantage. This advantage resides in the fact that the arms can twist to permit the trailer chassis to rock sideways and thereby equalize the load on the two trailer ground wheels 16, particularly when traveling over a relatively uneven terrain. Such equalization of the loads on the wheels minimizes or eliminates shimmying of the wheels and thus reduces tire wear. Locating the wheels close to the centerline of the trailer chassis, and, therefore, to one another, also aids in equalizing the load on the wheels.

Figure 4:
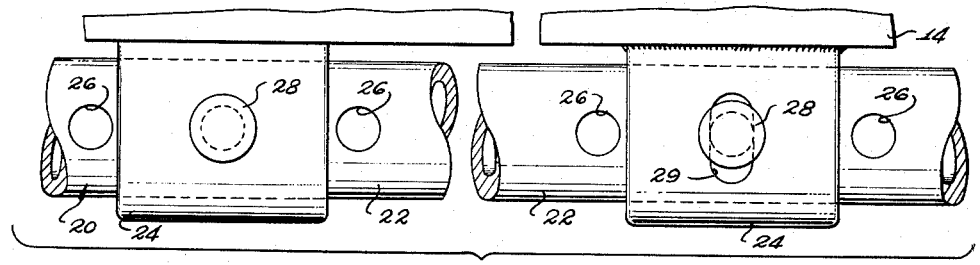
FIG. 4 is an enlarged view looking in the direction of the arrows on line 4—4 in FIG. 1.

It is evident that if the pins 28 which anchor the hitch arms 20 to the forward sleeve brackets 24 fit closely in the holes 26 in the arms, the effective torsional spring length of the arms extends only to the latter brackets. The effective spring length of the arms can be increased in two ways. First, the pins 28 in the forward sleeve brackets may be omitted. In the alternative, the holes 29 in the two forwardly located bracket sleeves 24 which receive the forward locking pins 28 may be circumferentially elongated, as shown in FIG. 4, to permit the arms to twist in the latter brackets. The pins, however, still restrain the hitch arms in the longitudinal direction. In either case, the hitch arms may be longitudinally adjusted in accordance with the distance from the rear wheels to the rear bumper of the towing vehicle 12.

When the trailer 10 is uncoupled from the towing vehicle 12, or when coupling the trailer to or uncoupling the trailer from the towing vehicle, the forward ends of the hitch arms 20 may be supported on vertically adjustable jack stands 100 which are releasably attached to the arms and which may be raised and lowered to level the trailer or adjust the height of the arms relative to the vehicle wheels 38. In this regard, the fact that the spring action of the hitch arms is furnished by their torsional elasticity rather than by lateral bending of the arms is important. In other words, if the hitch arms were resilient in lateral bending, the trailer would exhibit undesirable rocking and bouncing motion when occupied with the arms uncoupled from the towing vehicle and supported on the jack stands. This undesirable rocking and bouncing motion is uniquely eliminated while preserving the required spring action of the hitch arms by making the arms torsionally resilient but stiff in lateral bending, as described earlier.

The wheel couplings 30 described above are desirable since the relatively long extension of the ball shafts 54 compensates for variations in the widths of different vehicles. In other words, the extension of these shafts permits the hitch arms 20 to be engaged over the shafts, without manually springing the arms toward or away from one another, regardless of the width of the towing vehicle to which the wheel couplings are attached. The arms may then be easily sprung apart, as required to engage them with the ball shaft heads 82, by means of the wing nuts 86. Another advantage of the wheel couplings 30 is that the wing nuts 86 need not be removed from the ball shafts when coupling or uncoupling the trailer, thereby eliminating the problem of rethreading the nuts on the ball shafts.

Figure 5:
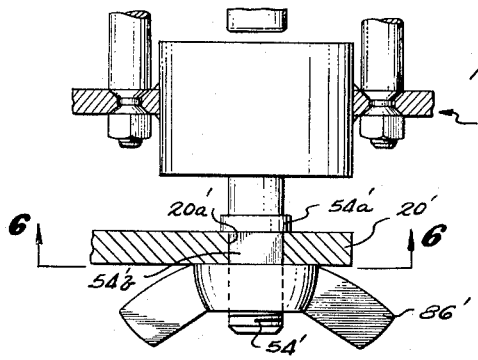
FIG. 5 illustrates a modified wheel coupling according to the invention.
Figure 6:
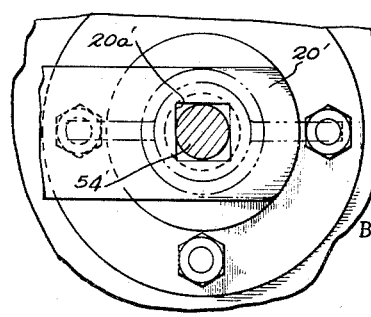
FIG. 6 is a section taken on line 6—6 in FIG. 5.

FIGS. 5 and 6 illustrate a modified wheel coupling 30' according to the invention. This modified wheel coupling is identical to the earlier wheel couplings 30 except that in coupling 30', the ball shaft 54' has an intermediate shoulder 54'a and the wing nut 86' is threaded on the end of the shaft. In this case, the hitch arm 20' has a square aperture 20'a which fits over a square portion 54'b of the ball shaft. The hitch arm 20' is obviously removed from the shaft by removing the wing nut 86' and sliding the arm axially off the shaft.

Clearly, therefore, the invention herein described and illustrated is fully capable of attaining the objects and advantages set forth.

Various modifications in the design, arrangement of parts, and instrumentalities of the invention are obviously possible within the spirit and scope of the following claims.

I claim:

1. A wheel coupling for a trailer of the character described, comprising:
   a wheel coupling plate;
   a self-aligning bearing including a housing centrally mounted on said plate, a ball within said housing having a shaft extending externally of the housing through an opening in one end thereof to one side of said plate, and roller bearing means mounting said ball in said housing for universal swivel motion about a center located on the axis of said shaft and rotation about said axis;
   means for mounting said plate on the rear wheel of a vehicle with said swivel center located approximately on the wheel axis;
   a nut threaded on the external end of said shaft and having a seating face facing and engageable with said housing to secure said shaft in a fixed position with its axis generally normal to said plate; and
   means for attaching an arm of a vehicle hitch to the external end of said shaft.

2. A wheel coupling for a trailer of the character described, comprising:
   a wheel coupling plate;
   a self-aligning bearing including a housing centrally mounted on said plate, a ball within said housing having a shaft extending externally of the housing through an opening in one end thereof to one side of said plate, and roller bearing means mounting said ball in said housing for universal swivel motion about a center located on the axis of said shaft and rotation about said axis;
   means for mounting said plate on the rear wheel of a vehicle with said swivel center located approximately on the wheel axis;
   said shaft having an enlarged head on its outer extremity;
   a nut threaded on said shaft between said housing and head for movement toward and away from said head; and
   said nut having a seating face facing and engageable with said housing to secure said shaft in a fixed position with its axis generally normal to said plate.

3. A trailer comprising:
   a chassis including ground-engaging wheel means;
   a pair of hitch arms connected at their rear ends to opposite sides of said chassis and extending forwardly therefrom to straddle the rear wheels of a towing vehicle;
   a wheel coupling plate at the forward end of each hitch arm;
   means for attaching each coupling plate to a rear wheel of the towing vehicle;
   a self-aligning bearing on each coupling plate including a housing centrally mounted on the respective coupling plate, a ball within said housing having a shaft extending externally of the housing to one side of said plate through an opening in one end of the housing, and roller bearing means in said housing mounting said ball in said housing for universal swivel motion about a center located approximately on the axis of said shaft and rotation about said axis;
   means securing the outer end of each shaft to the respective hitch arm; and
   said arms being torsionally elastic along substantially their entire length from said coupling plates to the connection between the arms and said trailer chassis.

References Cited by the Examiner
UNITED STATES PATENTS

| | | | |
|---|---|---|---|
| 738,884 | 9/03 | Clay | 280—503 |
| 1,330,289 | 2/20 | Thurmond | 280—483 X |
| 1,910,926 | 5/33 | Lutz | 308—72 X |
| 1,986,149 | 1/35 | Harris | 280—511 X |
| 2,189,183 | 2/40 | Sherman | 280—483 |
| 2,743,118 | 4/56 | Dotson | 280—482 X |
| 2,834,599 | 5/58 | Sarchet | 280—34 X |

FOREIGN PATENTS

| | | |
|---|---|---|
| 653,996 | 5/51 | Great Britain. |

A. HARRY LEVY, *Primary Examiner.*

LEO FRIAGLIA, *Examiner.*